(12) United States Patent
Aldous

(10) Patent No.: US 9,447,327 B2
(45) Date of Patent: Sep. 20, 2016

(54) ASPHALT OXIDATION PROCESS USING LIQUID JET EJECTION

(71) Applicant: Keith K. Aldous, Winchester, VA (US)

(72) Inventor: Keith K. Aldous, Winchester, VA (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 217 days.

(21) Appl. No.: 14/484,484

(22) Filed: Sep. 12, 2014

(65) Prior Publication Data

US 2014/0374310 A1    Dec. 25, 2014

Related U.S. Application Data

(63) Continuation-in-part of application No. 13/304,964, filed on Nov. 28, 2011, now abandoned.

(60) Provisional application No. 61/417,747, filed on Nov. 29, 2010.

(51) Int. Cl.
| | |
|---|---|
| *C10C 3/04* | (2006.01) |
| *C08L 95/00* | (2006.01) |
| *B01F 5/04* | (2006.01) |
| *C10C 3/00* | (2006.01) |
| *C10C 3/02* | (2006.01) |

(52) U.S. Cl.
CPC .............. *C10C 3/04* (2013.01); *B01F 5/0413* (2013.01); *C08L 95/00* (2013.01)

(58) Field of Classification Search
CPC ............. C10C 3/00; C10C 3/02; C10C 3/04; C08L 95/00; B01F 5/0413
See application file for complete search history.

(56) References Cited

U.S. PATENT DOCUMENTS

| | | | |
|---|---|---|---|
| 1,953,345 | A | 4/1934 | Gard et al. |
| 2,762,756 | A | 9/1956 | Kinnaird, Jr. |
| 6,033,576 | A | 3/2000 | Russo |

FOREIGN PATENT DOCUMENTS

| | | |
|---|---|---|
| GB | 904900 | 9/1962 |
| RU | 20131907 C1 | 6/1999 |
| RU | 2203132 C1 | 4/2003 |
| RU | 2218379 C2 | 12/2003 |
| SU | 1781284 A1 | 12/1992 |
| SU | 1792342 A3 | 1/1993 |

OTHER PUBLICATIONS

Genereaux, R. P. et al., Perry's Chemical Engineers' Handbook, 6th Edition, Section 6, pp. 6-32 to 6-34.

Yakovlev, S.P. et al., "Production of Better-Quality Oxidized Asphalts, Process Implementation," Chemistry and Technology of Fuels and Oils, 2003, vol. 39, Issues 1-2, pp. 54-59.

Yakovlev, S.P. et al., "Universal System for Injection Feed of Feedstock and Air into a Vacuum Resid Oxidation Reactor," Chemistry and Technology of Fuels and Oils, 2008, vol. 44, Issue 4, pp. 225-230.

*Primary Examiner* — Brian McCaig
(74) *Attorney, Agent, or Firm* — Robert A. Migliorini

(57) ABSTRACT

Provided is a process for increasing the softening temperature of asphalts by use of liquid jet ejector with a diptube connected to the discharge connection of the liquid jet ejector for ejecting an air/asphalt mixture below a liquid level in an oxidizer vessel. The liquid jet ejector is used as both an air compressor and an air/oil mixer. The liquid jet ejector motive fluid is hot asphalt and the entrained vapor is air. The combined liquid jet ejector with a diptube process provides for an improvement in asphalt air blowing efficiency by requiring less cumulative air to produce a given asphalt softening temperature.

17 Claims, 5 Drawing Sheets

ASPHALT OXIDATION PROCESS USING LIQUID JET EJECTION

CROSS-REFERENCE TO RELATED APPLICATIONS

This is a Continuation-In-Part Application which claims priority to non-provisional application U.S. Ser. No. 13/304,964 filed on Nov. 28, 2011, now abandoned, which claims priority to U.S. Provisional Application No. 61/417,747 filed on Nov. 29, 2010, both of which are herein incorporated by reference in their entirety.

FIELD

The present disclosure provides a process for increasing the softening temperature of asphalts by use of liquid jet ejector technology, which is used as both air compressor and air/oil mixer. The liquid jet ejector motive fluid is hot asphalt and the entrained vapor is air.

BACKGROUND

Asphalt is one of the world's oldest engineering materials, having been used since the beginning of civilization. Asphalt is a strong, versatile and chemical-resistant binding material that adapts itself to a variety of uses. For example, asphalt is used to bind crushed stone and gravel into firm tough surfaces for roads, streets, and airport runways. Asphalt, also known as pitch, can be obtained from either natural deposits, or as a by-product of the petroleum industry. Natural asphalts were extensively used until the early 1900s. The discovery of refining asphalt from crude petroleum and the increasing popularity of the automobile served to greatly expand the asphalt industry. Modern petroleum asphalt has the same durable qualities as naturally occurring asphalt, with the added advantage of being refined to a uniform condition substantially free of organic and mineral impurities.

Most of the petroleum asphalt produced today is used for road surfacing. Asphalt is also used for expansion joints and patches on concrete roads, as well as for airport runways, tennis courts, playgrounds, and floors in buildings. Another major use of asphalt is in asphalt shingles and roll-roofing which is typically comprised of felt saturated with asphalt. The asphalt helps to preserve and waterproof the roofing material. Other applications for asphalt include waterproofing tunnels, bridges, dams and reservoirs, rust-proofing and sound-proofing metal pipes and automotive under-bodies; and sound-proofing walls and ceilings.

The raw material used in modern asphalt manufacturing is petroleum, which is naturally occurring liquid bitumen. Asphalt is a natural constituent of petroleum, and there are crude oils that are almost entirely asphalt. The crude petroleum is separated into its various fractions through a distillation process. After separation, these fractions are further refined into other products such as asphalt, paraffin, gasoline, naphtha, lubricating oil, kerosene and diesel oil. Since asphalt is the base or heavy constituent of crude petroleum, it does not evaporate or boil off during the distillation process. Asphalt is essentially the heavy residue of the oil refining process.

If asphalt is to be used for a purpose other than paving, such as roofing, pipe coating, or as an under sealant or water-proofing material, the asphalt is usually oxidized, typically by air blowing. Oxidation produces an asphalt material that softens at a higher temperature than non-oxidized asphalts. Oxidation is conventionally done by air blowing at the refinery, at an asphalt processing plant, or at a roofing material plant. Air blowing modifies the asphalt by an oxidation process that involves the blowing of air through the asphalt, either on a batch or continuous basis, with a short residue time at a temperature from 175° C. to 300° C.

While processes for oxidizing asphalt have been commercial for many years, there still remains a need in the art for ever more cost effective processes for modifying the physical properties of asphalt by oxidation.

SUMMARY

In accordance with the present disclosure there is provided a process for increasing the softening point of asphalt including the following steps: providing a liquid jet ejector comprising a motive inlet, a motive nozzle, a suction port, a main ejector body, a venturi throat and diffuser, and a discharge connection; conducting a preheated asphalt feed including fresh asphalt and recycled oxidized asphalt, at a temperature from 125° C. to 300° C., as the motive liquid into the motive inlet of the liquid jet ejector, drawing air into the suction port of the liquid jet ejector; mixing the preheated asphalt within the main ejector body with the air from the suction port of the liquid jet ejector to form an air/asphalt mixture; conducting the air/asphalt mixture to a heated and pressurized oxidizer vessel via a diptube connected to the discharge connection of the liquid jet ejector; ejecting the air/asphalt mixture from an exit port of the diptube positioned below a liquid level in the oxidizer vessel; collecting an off-gas from the overhead of the oxidizer vessel and an oxidized asphalt product stream from the bottoms of the oxidizer vessel, wherein said oxidized asphalt product stream has softening temperature greater than the preheated asphalt feed; and recycling a portion of the oxidized asphalt product stream plus fresh asphalt back to the liquid jet ejector to form the preheated asphalt feed.

BRIEF DESCRIPTION OF THE FIGURES

To assist those of ordinary skill in the relevant art in making and using the subject matter hereof, reference is made to the appended drawings, wherein.

DETAILED DESCRIPTION

Figure 1:
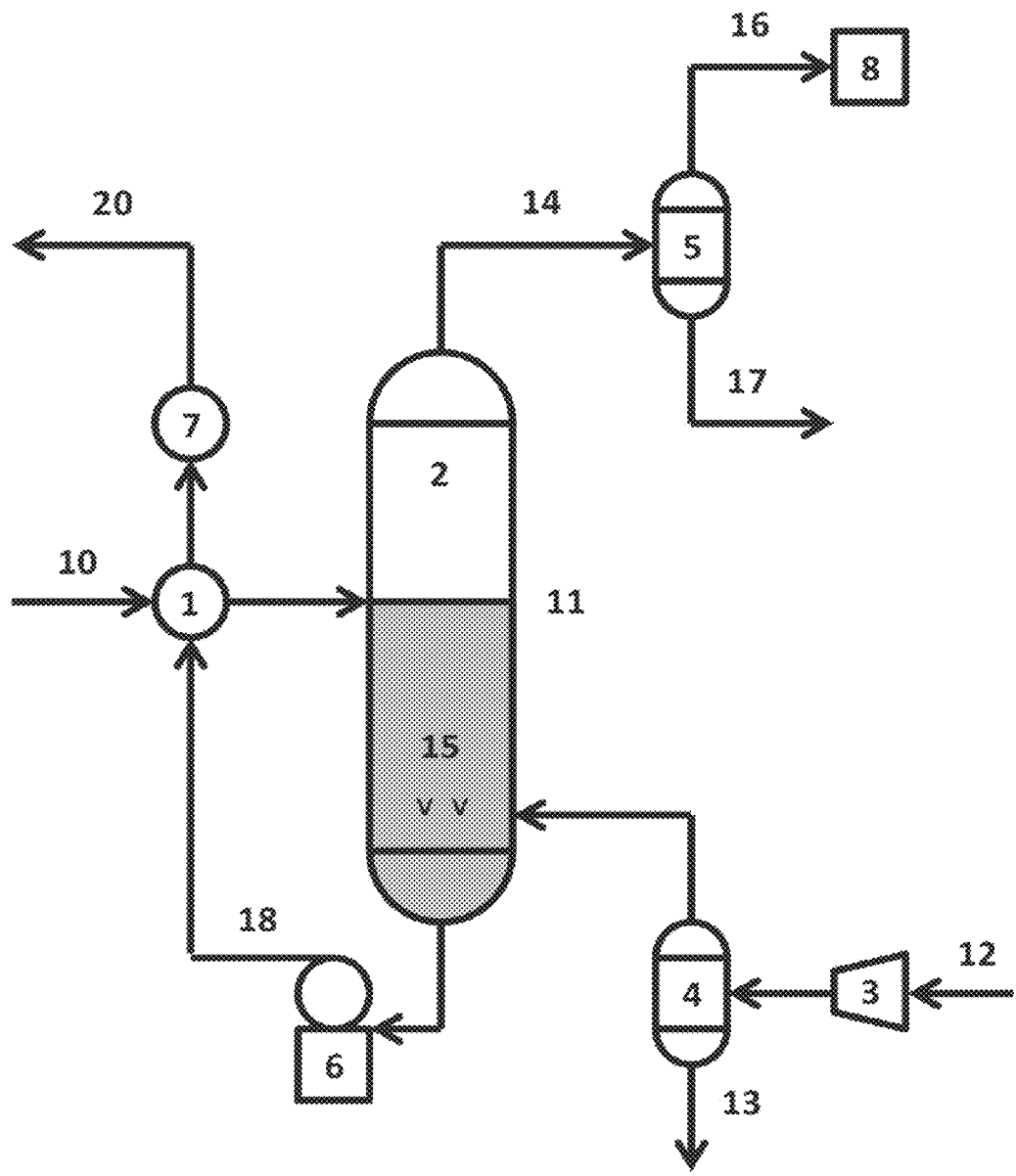
FIG. 1 hereof is a process flow scheme of a conventional asphalt oxidation process (Prior art process).

All numerical values within the detailed description and the claims herein are modified by "about" or "approximately" the indicated value, and take into account experimental error and variations that would be expected by a person having ordinary skill in the art.

The instant disclosure is suitable for increasing the softening temperature of any type of asphalt, both naturally occurring and asphalts that result from the distillation of crude oil. Although it is typically desired to increase the softening temperature of asphalt for uses other than paving, it may be desirable to also increase the softening temperature for asphalts for some paving applications. When the asphalt is to be used for applications such as roofing, pipe coating, or as an under sealant or water-proofing material, it is highly desirable to increase its softening temperature. Such uses typically require the asphalt to have a softening temperature higher than asphalt used for paving roads. The softening temperature is typically increased by oxidizing the asphalt. The softening temperature of asphalts is increased conventionally by an oxidation process that involves the blowing of air through the asphalt, either on a batch or a continuous basis, with the asphalt at a temperature from 175° C. to 300° C.

Conventional air blowing usually involves preheating the asphalt, after which it is introduced into a blowing, or oxidizer column just below the normal liquid level. Air is blown through the asphalt by means of an air distributor located at the bottom of the column. The air serves not only as the reactant, but also serves to agitate and mix the asphalt, thereby increasing the surface area and rate of reaction. Oxygen is consumed by the asphalt as the air ascends through the material. Steam and water are typically sprayed into the vapor space above the asphalt level, the former to suppress foaming and dilute the oxygen content of waste gases and the later cools the vapors to prevent after-burning. The "blown" product flows from the bottom of the blowing column via an external draw-off line and is pumped through heat exchangers to achieve the desired product temperature and to provide an economical means of preheating the incoming asphalt feed. The penetration and softening point of the blown asphalt are affected by such things as: the viscosity of the feedstock, the temperature in the blowing column, the origin of the crude oil used to manufacture the feedstock, the liquid residence time within the oxidizer, and the air-to-feed ratio.

The blowing process dehydrogenates the asphalt, resulting in oxidation and polycondensation, increasing the overall molecular size of the asphaltenes already present in the feed and forming additional asphaltenes from the maltene phase. Because the reaction is exothermic, close temperature control of the process is required, which is typically achieved by regulating the air-to-asphalt ratio in the blowing column.

To produce penetration grade asphalt suitable for certain road construction applications, asphalt manufactured from select crudes requires only a limited amount of air blowing. This process is termed semi-blowing, or air rectification. Used judiciously, semi-blowing can be applied to asphalt to reduce the temperature susceptibility of the asphalt, for example, increasing its penetration index. The penetration index is a measure of the way the binder's (asphalt) consistency (penetration value) changes with temperature. It can be calculated from the penetration at two different temperatures, or from the penetration at one temperature and the softening point.

Fully blown or oxidized asphalts are conventionally produced by vigorous air-blowing of short residue or short residue blended with a heavy distillate. Short residue is the residue left after vacuum distillation. The position of the blowing curve is primarily dependent on the viscosity of the feed; i.e., the softer the feed the higher the curve. The severity of blowing depends on the temperature in the column, the air to feed ratio, and the liquid residence time. Thus, by controlling the viscosity of the feed and the conditions in the column, all the blown grades of asphalts can be manufactured.

Oxidized asphalts are used almost entirely for industrial applications, e.g. roofing, flooring mastics, pipe coatings, paints, etc., and are specified and designated by both softening point and penetration tests, e.g. 85/40 is an oxidized grade asphalt with a softening point of 85° C. plus or minus 5° C. and a penetration of 40 dmm plus or minus 5 dmm.

The aim of the oxidation process is the formation of asphaltenes in which the following three phenomena can be identified:

Reactions during which the size of the molecules increases. The formation of esters is particularly important and not only account for at least 60% of the oxygen in oxidized asphalt, but also link two different molecules and thus contribute to the formation of a material having a higher molecular weight. This mechanism results in an increase in the asphaltene content and a change in the colloid-chemical constitution and rheological properties of the asphalt.

Reactions during which the size of the molecule is unchanged. For example, the formation of cyclic hydrocarbons by means of dehydrogenation with $H_2O$ as a side product.

Reactions during which the size of the molecule decreases. For example, separation of side branches from molecules with blown distillate produced as a side product.

This disclosure can be better understood with reference to the Figures hereof. FIG. 1 hereof is a process flow scheme of a conventional asphalt oxidation process (prior art process). An asphalt feed is passed via line 10 through heat exchanger 1 where it is preheated to a temperature from 125° C. to 300° C., then to oxidizer vessel 2 (also may be referred to as an asphalt separator vessel or an asphalt separator throughout the disclosure) at or below liquid level 11. Air, via line 12, is also introduced to oxidizer vessel 2 by first compressing it by use compressor 3 then passing it through knockout drum 4 to remove any condensed water or other liquids via line 13. The air flows upward through a distributor 15 and countercurrent to down-flowing asphalt. The air is not only the reactant, but also serves to agitate and mix the asphalt, thereby increasing the surface area and rate of reaction. Oxygen is consumed by the asphalt as the air ascends through the down flowing asphalt. Steam or water can be sprayed (not shown) into the vapor space above the asphalt to suppress foaming and to dilute the oxygen content of waste gases that are removed via line 14 and conducted to knockout drum 5 to remove any condensed or entrained liquids via line 17. The oxidizer vessel 2 is typically operated at low pressures of 0 to 2 barg. The low pressure off-gas, which is primarily comprised of nitrogen and water vapor, is often conducted via line 16 to an incinerator 8 where it is burned before being discharged to the atmosphere. The oxidized asphalt product stream is then conducted via line 18 and pumped via pump 6 through heat exchanger 1 wherein it is used to preheat the asphalt feed being conducted to oxidizer vessel 2. The hot asphalt product stream is then conducted via line 20 to steam generator 7 where it is cooled prior to going to storage. While such a conventional process has been commercially successful, there is still much room for improvement.

Figure 2:
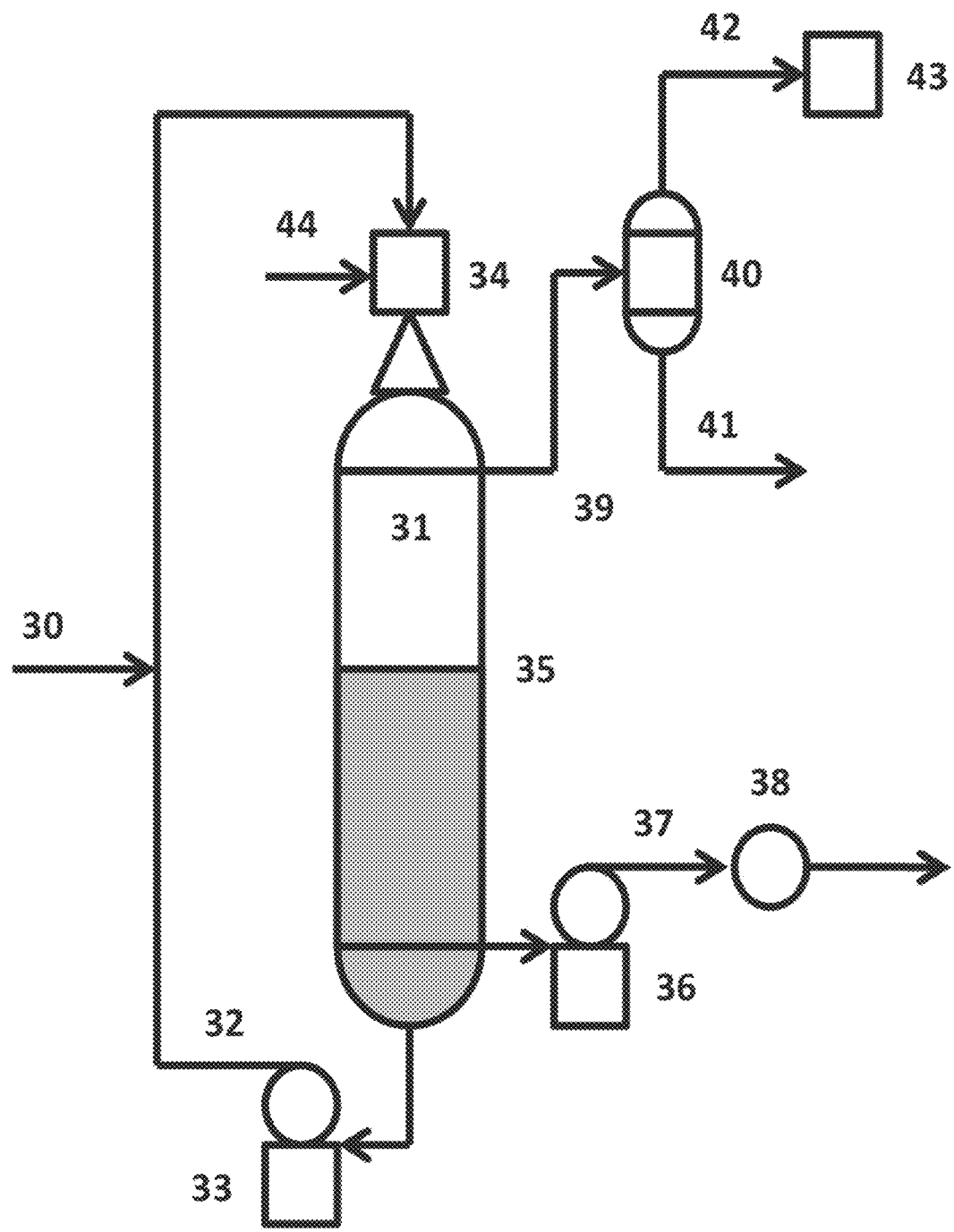
FIG. 2 hereof is a process flow scheme of another prior art asphalt oxidation process using a liquid jet ejector as disclosed in U.S. Pat. No. 2,762,756 to Kinnaird.

FIG. 2 hereof is a process flow scheme of another prior art asphalt oxidation process using a liquid jet ejector as disclosed in U.S. Pat. No. 2,762,756 to Kinnaird. An asphalt feed is passed via line 30 and combined with asphalt recycle 32 which exits the bottom of oxidizer vessel 31 and is pumped via pump 33. The combined asphalt feed 30 and asphalt recycle 32 are conducted through liquid jet ejector 34 as the motive fluid and entrain atmospheric air 44 into the ejector where it is intimately mixed and reacted with the asphalt feed 30 and asphalt recycle 32. The resulting stream emerging from the bottom of the ejector (not numbered) is ejected into the vapor space of oxidizer vessel 31 above the liquid level 35. Steam or water can be sprayed (not shown) into the vapor space above the asphalt to suppress foaming and to dilute the oxygen content of waste gases that are removed via line 39 and conducted to knockout drum 40 to remove any condensed or entrained liquids via line 41. The oxidizer vessel 31 is typically operated at low pressures of 0 to 2 barg. The low pressure off-gas, which is primarily comprised of nitrogen and water vapor, is conducted via line 42 to an incinerator 43 where it is burned before being discharged to the atmosphere. The oxidized asphalt product stream is then conducted via line 37 and pumped via pump 36 through steam generator 38 where it is cooled prior to going to storage (not shown). This prior art asphalt oxidation process using a liquid jet ejector of FIG. 2 represents an improvement over the conventional prior art by eliminating the air compressor and improving the air/asphalt mixing for more efficient asphalt oxidation as determined by a reduction in required air for a given oxidation severity.

The process of the instant disclosure for oxidizing asphalts presents a substantial improvement over both the conventional prior art process of FIG. 1 and the prior art liquid jet ejector process of FIG. 2. More specifically, the use of the liquid jet ejector technology of the present disclosure adds a diptube to the liquid jet ejector outlet and extends it to eject the air/asphalt mix below the oxidizer vessel liquid level. The diptube is sized to maintain a turbulent, dispersed bubble flow pattern through the length of the diptube to provide the mixing/time required to more closely approach the stoichiometric air requirement. The air/asphalt mix is ejected well below the surface of the oxidizer vessel liquid level so as to provide more air/asphalt mixing and stripping of light ends from the asphalt product. The result is a further improvement in asphalt air blowing efficiency as compared to prior art process of FIG. 2. In particular, less cumulative air is required to produce the same softening point of the asphalt with the liquid jet ejector process including a diptube positioned below the liquid level in the oxidizer vessel compared to the prior art process of FIG. 2 with no diptube. With the inventive process of FIG. 3, the cumulative air required to produce the same softening point of the asphalt may be at least 10% less, or at least 20% less, or at least 30% less, or at least 40% less, or at least 50% less, or at least 55% less, or at least 60% less, or at least 70% less than the same process without a diptube (FIG. 2).

Figure 3:
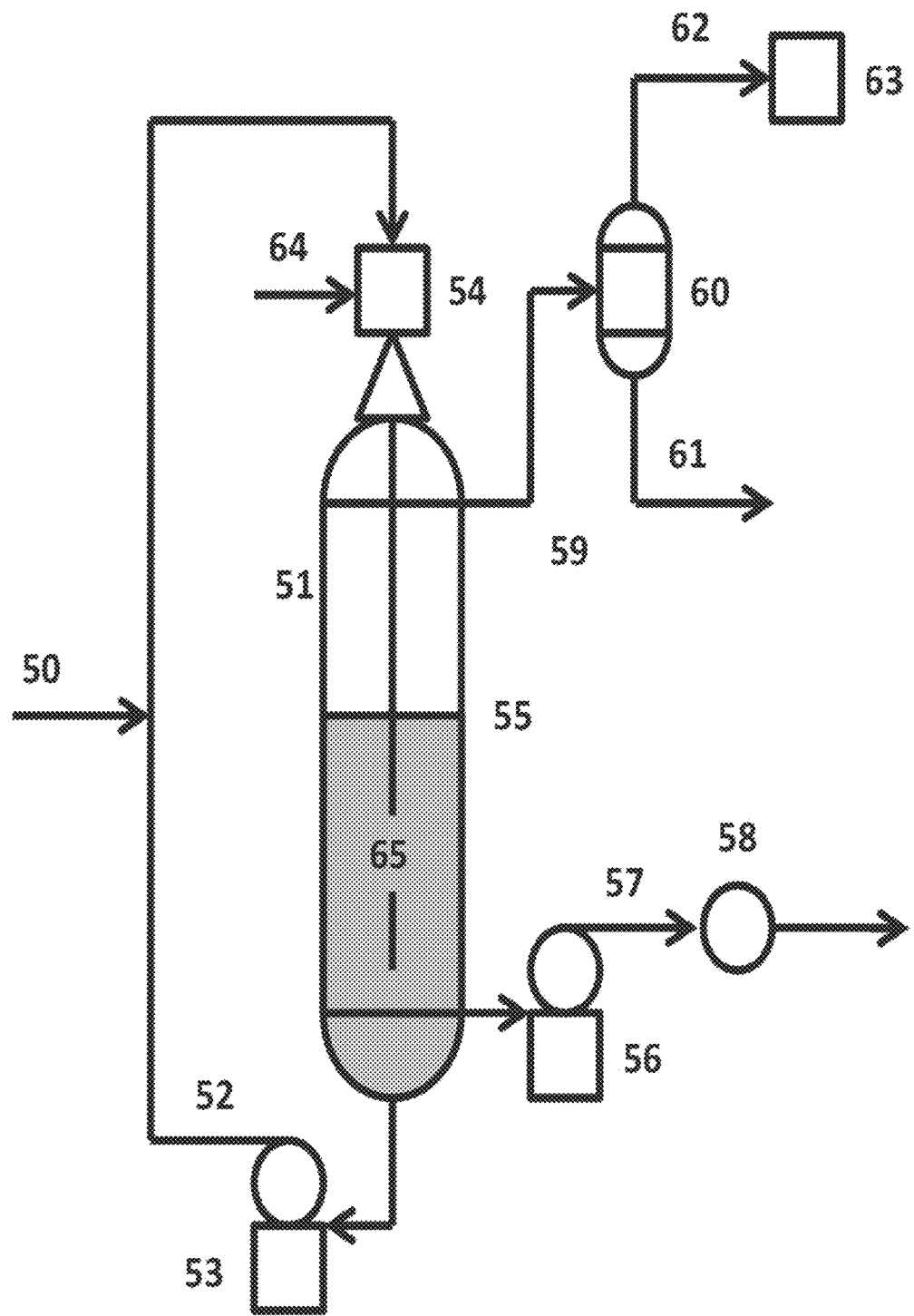
FIG. 3 hereof is a process flow scheme of the inventive asphalt oxidation process using a liquid jet ejector of the present disclosure.

FIG. 3 hereof is a process flow scheme of the inventive liquid jet ejector process of the present disclosure for oxidizing asphalts. An asphalt feed is passed via line 50 and combined with asphalt recycle 52 which exits the bottom of oxidizer vessel 51 and is pumped via pump 53. The combined asphalt feed 50 and asphalt recycle 52 are conducted through a liquid jet ejector 54 as the motive fluid and entrain atmospheric air 64 into the ejector where it is intimately mixed and reacted with the asphalt feed 50 and asphalt recycle 52. The pressurized air/asphalt mixture from the bottom of the ejector 54 is then conducted via a diptube 65 to the oxidizer vessel 51 and ejected below liquid level 55. The diptube 65 may be at least 1 inch, or 3 inches, or 5 inches, or 7 inches, or 9 inches, or 11 inches below the liquid level 55 of the oxidizer vessel 51. Alternatively, the diptube may be at least 6 to 12 inches, or 6 to 10 inches from the bottom of the oxidizer vessel 51, and still below the liquid level 55.

The pressure of the mixture exiting the liquid jet ejector will be in excess of the pressure at which the oxidizer is operated and will be further adjusted to allow for the resulting off gas from the oxidizer to be introduced into the fuel gas system of the refinery. The oxidizer vessel 51 is operated at pressures from 0 to 10+ barg, preferably from 0 to 5 barg and more preferably from 0 to 2 barg. The temperature of the oxidizer vessel will be from 150° C. to 300° C., preferably from 200° C. to 270° C., and more preferably from 250° C. to 270° C. It is preferred that the temperature within the separator will be at least 10° C. higher, preferably 20° C., and more preferably 30° C. higher than the incoming asphalt feed temperature.

Steam or water can be sprayed (not shown) into the vapor space above the asphalt to suppress foaming and to dilute the oxygen content of waste gases that are removed via line 59 and conducted to knockout drum 60 to remove any condensed or entrained liquids via line 61. The oxidizer vessel 51 is typically operated at low pressures of 0 to 2 barg. The low pressure off-gas, which is primarily comprised of nitrogen and water vapor, is often conducted via line 62 to an incinerator 63 where it is burned before being discharged to the atmosphere. The oxidized asphalt product stream is then conducted via line 57 and pumped via pump 56 through steam generator 58 where it is cooled prior to going to storage (not shown).

The amount of oxidized asphalt recycle from the separator will be at least 5 times, preferably at least 10 times, and more preferably at least 20 times that of the volume of incoming asphalt feed. By effective amount of air we mean at least a stoichiometric amount, but not so much that it will cause undesirable results from either a reaction or a process point of view. The stoichiometric amount of air will be determined by the amount of oxidizable components in the particular asphalt feed. It is preferred that a stoichiometric amount of air be used.

Any suitable liquid jet ejector can be used in the practice of the present disclosure. Liquid jet ejectors are typically comprised of a motive inlet, a motive nozzle, a suction port, a main body, a venturi throat and diffuser, and a discharge connection, wherein the hot asphalt, at a temperature from 125° C. to 300° C., is conducted as the motive liquid into said motive inlet and wherein air is drawn into the suction port and mixed with the asphalt within the ejector body. The air drawn into the suction port of the liquid jet ejector may be either atmospheric air or compressed air.

The following are examples of the present disclosure and are not to be construed as limiting.

EXAMPLES

A batch pilot process was constructed to test the feasibility of the use of a liquid jet ejector to entrain the necessary air and mix the air/oil sufficiently for the asphalt oxidation reaction to occur. The original design included the diptube to initially provide stripping of the asphalt. It was unexpectedly discovered upon removal of the diptube that the air blowing efficiency was significantly deteriorated. The results for the two experimental runs: Run #1 (FIG. 3 inventive liquid jet ejector process with the diptube) and Run #2 (FIG. 2 prior art liquid jet ejector process without the diptube) are compared in Table 1 below.

TABLE 1

Liquid Jet Ejector Batch Pilot Air Blower

Pilot Run #1 - with diptube (disclosure)

| | | | | | | |
|---|---|---|---|---|---|---|
| temperature | deg C. | 251 | 257 | 252 | 252 | 249 |
| pressure | kpag | 28 | 28 | 21 | 103 | 103 |
| cumulative air | liters/kg | 0 | 24 | 62 | 93 | 100 |
| mixer | rpm | none | none | none | none | none |
| offgas oxygen | vol. % | | | | 1.5% | 1.4% |
| viscosity at 135 C. | cSt | 199 | 271 | 366 | 757 | 870 |
| penetration at 25 C. | dmm | 194 | 129 | | 43 | 38 |
| softening point | deg C. | 38.0 | 42.2 | | 55.2 | 57.6 |

Pilot Run #2 - without diptube (U.S. Pat. No. 2,762,756 - Kinnaird)

| | | | | | | | | |
|---|---|---|---|---|---|---|---|---|
| temperature | deg C. | 189 | 199 | 202 | 202 | 231 | 244 | 249 |
| pressure | kpag | 28 | 28 | 34 | 28 | 28 | 28 | 28 |
| cumulative air | liters/kg | 0 | 9 | 18 | 36 | 55 | 64 | 73 |
| mixer | rpm | none | none | none | none | none | none | none |
| offgas oxygen | vol % | | 17.5% | 18.0% | 18.2% | 15.0% | 11.7% | 10.4% |
| viscosity at 135 C. | cSt | 212 | | 231 | 260 | 296 | | 342 |
| penetration at 25 C. | dmm | 173 | | 151 | 130 | 107 | | 91 |
| softening point | deg C. | 38.8 | | 39.8 | 41.3 | 43.3 | | 44.8 |

Figure 4:
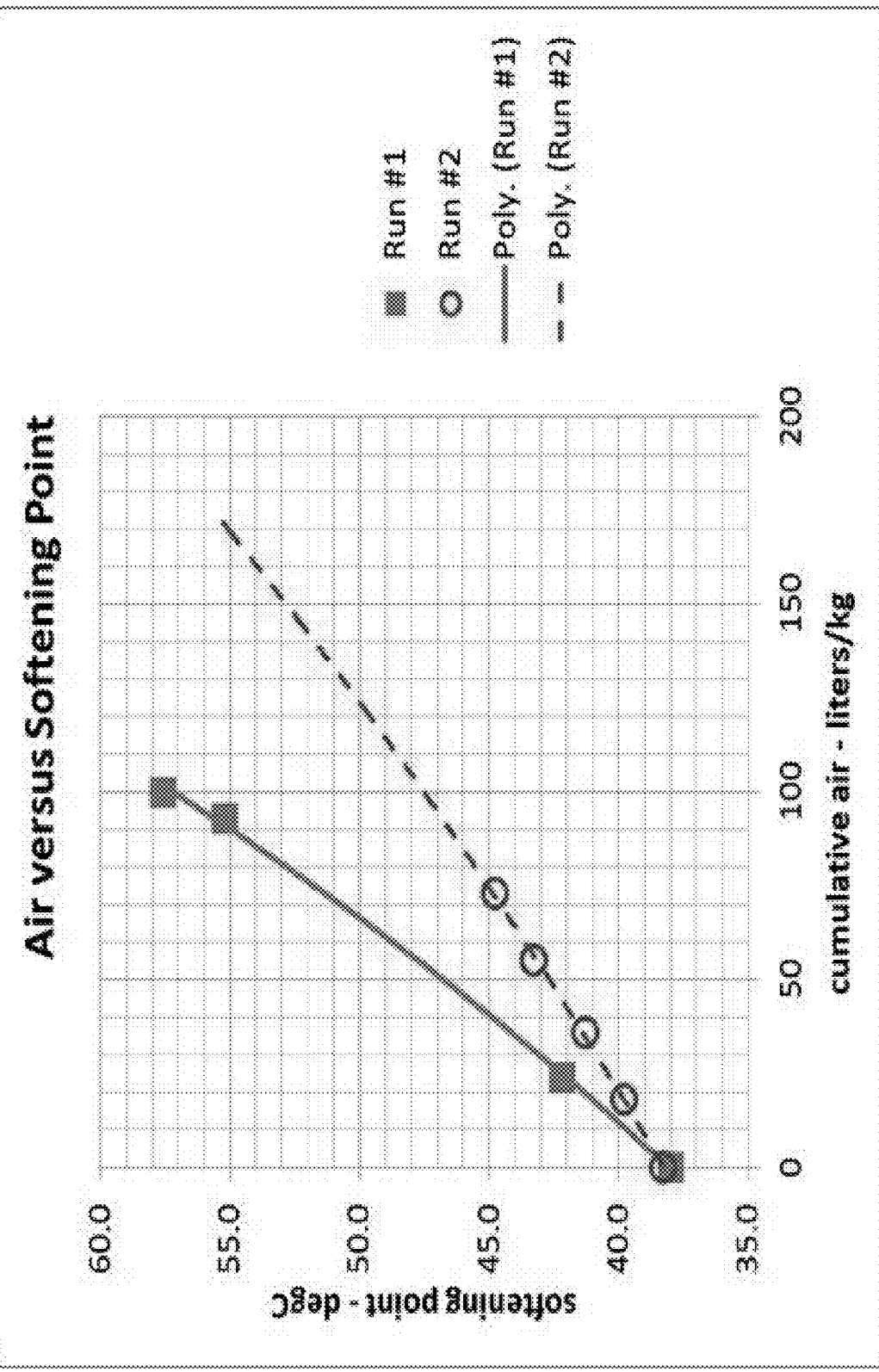
FIG. 4 hereof is a graph of asphalt softening point versus cumulative air for asphalt produced via the prior art asphalt oxidation process using a liquid jet ejector of FIG. 2, and the inventive process of FIG. 3 disclosed herein.

As can be seen in FIG. 4 which is a graph of asphalt softening point versus cumulative air, Run #1—with diptube (inventive example) displayed superior performance in terms of a higher softening point versus Run #2—without diptube (prior art comparative example) as determined by the relative amounts of air required to produce a given softening point. The data in FIG. 4 indicate that Run #1 required only 55% of the air (see cumulative air in liters/kg) required by Run #2 to produce the same softening point of the asphalt. This was unexpected and surprising, and therefore it is concluded that the diptube extended below the liquid level in the oxidizer vessel is largely responsible for the air blowing efficiency increase.

By comparison, the same feed was run three times on a conventional prior art batch pilot unit and the comparative results achieved are shown in Table 2 below.

As can be seen, the liquid jet ejector pilot process performed as well as or better than the conventional counterpart. It should be noted that the conventional pilot unit could not achieve the low offgas oxygen content at similar conditions as the liquid jet ejector pilot process signifying the improved efficiency of the liquid jet ejector air blower versus the conventional air blower.

Figure 5:
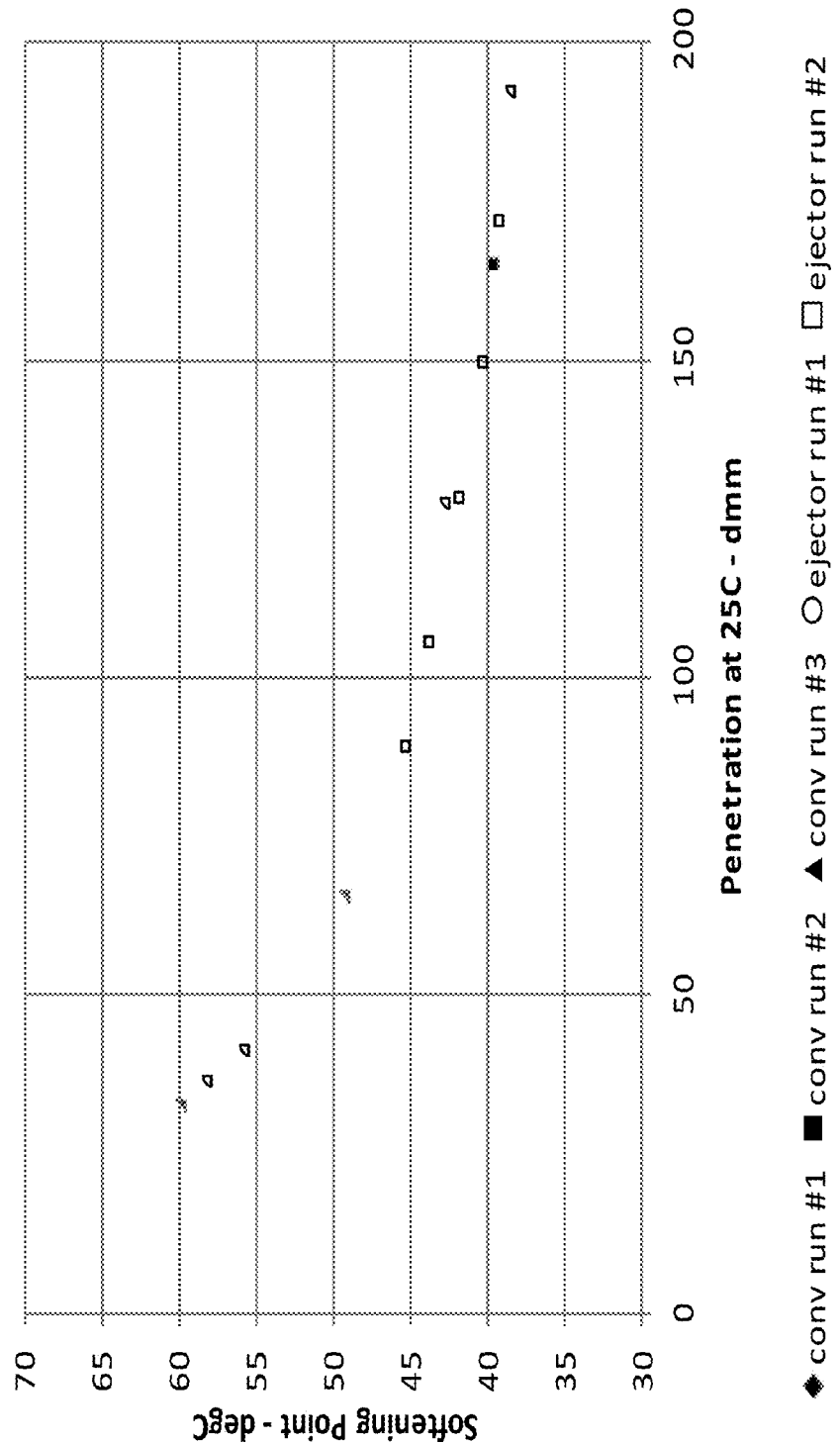
FIG. 5 hereof is a graph of oxidized asphalt penetration versus softening point for asphalt produced via the conventional asphalt oxidation process of FIG. 1, the prior art asphalt oxidation process using a liquid jet ejector of FIG. 2, and the inventive process of FIG. 3 disclosed herein.

Oxidized asphalt product penetration versus softening point for product produced from the inventive and prior art processes are compared graphically in FIG. 5. The results indicate no differences between the prior art processes and the inventive process with regard to these properties.

Applicants have attempted to disclose all embodiments and applications of the disclosed subject matter that could be reasonably foreseen. However, there may be unforeseeable,

TABLE 2

Conventional Stirred Batch Pilot Air Blower

Pilot Run #1

| | | | | |
|---|---|---|---|---|
| temperature | deg C. | 250 | 250 | 250 |
| pressure | kpag | 0 | 0 | 0 |
| cumulative air | liters/kg | 0 | 50 | 100 |
| mixer | rpm | 1750 | 1750 | 1750 |
| offgas oxygen | vol % | 5.7% | 8.1% | 9.5% |
| penetration at 25 C. | dmm | 167 | 67 | 34 |
| softening point | deg C. | 39.1 | 48.7 | 59.3 |

Pilot Run #2

| | | | | | | | |
|---|---|---|---|---|---|---|---|
| temperature | deg C. | 200 | 200 | 200 | 200 | 200 | 200 |
| pressure | kpag | 0 | 0 | 0 | 0 | 0 | 0 |
| cumulative air | liters/kg | 0 | 50 | 100 | 150 | 200 | 250 |
| mixer | rpm | 1750 | 1750 | 1750 | 1750 | 1750 | 1750 |
| offgas oxygen | vol % | 10.8% | 15.1% | 15.5% | 16.1% | 16.3% | 16.3% |
| penetration at 25 C. | dmm | 167 | 91 | 57 | 41 | 30 | 24 |
| softening point | deg C. | 39.1 | 44.4 | 49.6 | 55.0 | 60.2 | 66.0 |

Pilot Run #3

| | | | | | | | |
|---|---|---|---|---|---|---|---|
| temperature | deg C. | 250 | 250 | 250 | 250 | 250 | 250 |
| pressure | kpag | 0 | 0 | 0 | 0 | 0 | 0 |
| cumulative air | liters/kg | 0 | 50 | 150 | 250 | 350 | 650 |
| mixer | rpm | 0 | 0 | 0 | 0 | 0 | 0 |
| offgas oxygen | vol % | 10.5% | 19.4% | 19.4% | 19.4% | 19.5% | 19.5% |
| penetration at 25 C. | dmm | 167 | | | | 98 | 62 |
| softening point | deg C. | 39.1 | | | | 44.7 | 49.1 | insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

What is claimed is:

1. A process for increasing the softening point of asphalt comprising the following steps:
    providing a liquid jet ejector comprising a motive inlet, a motive nozzle, a suction port, a main ejector body, a venturi throat and diffuser, and a discharge connection;
    conducting a preheated asphalt feed including fresh asphalt and recycled oxidized asphalt, at a temperature from 125° C. to 300° C., as the motive liquid into the motive inlet of the liquid jet ejector;
    drawing atmospheric air or compressed air into the suction port of the liquid jet ejector;
    mixing the preheated asphalt within the main ejector body with the air from the suction port of the liquid jet ejector to form an air/asphalt mixture;
    conducting the air/asphalt mixture to a heated and pressurized oxidizer vessel via a diptube connected to the discharge connection of the liquid jet ejector;
    ejecting the air/asphalt mixture from an exit port of the diptube positioned below a liquid level in the oxidizer vessel;
    collecting an off-gas from the overhead of the oxidizer vessel and an oxidized asphalt product stream from the bottoms of the oxidizer vessel, wherein said oxidized asphalt product stream has softening temperature greater than the preheated asphalt feed; and
    recycling a portion of the oxidized asphalt product stream back to the liquid jet ejector to form the recycled oxidized asphalt.

2. The process of claim 1 wherein the oxidizer vessel is operated at a temperature from 150° C. to 300° C. with the proviso that it be at least 10° C. greater than the temperature of the preheated asphalt feed being conducted to said motive inlet of the liquid jet ejector.

3. The process of claim 2 wherein the oxidizer vessel is operated at a temperature from 200° C. to 270° C.

4. The process of claim 1 wherein the recycled oxidized asphalt feed rate is at least 5 times greater than that of the fresh asphalt feed rate.

5. The process of claim 4 wherein the recycled oxidized asphalt feed rate is at least 20 times greater than that of the fresh asphalt feed rate.

6. The process of claim 1 wherein the oxidizer vessel is operated at a pressure of from 0 to 10 barg.

7. The process of claim 6 wherein the oxidizer vessel is operated at a pressure of from 0 to 5 barg.

8. The process of claim 1 wherein the air feed rate is at least a stoichiometric amount based on the preheated asphalt feed rate.

9. The process of claim 1 further including the step of injecting steam from a steam generator to the oxidizer vessel.

10. The process of claim 9 wherein the injecting steam to the oxidizer vessel is above or below the liquid mixture in the oxidizer vessel.

11. The process of claim 1 wherein the air is compressed.

12. The process of claim 1 wherein the air is atmospheric.

13. The process of claim 1 wherein the exit port of the diptube is positioned at least 1 inch below the liquid level in the oxidizer vessel.

14. The process of claim 1 wherein the exit port of the diptube is positioned at least 5 inches below the liquid level in the oxidizer vessel.

15. The process of claim 1 wherein the exit port of the diptube is positioned from 6 to 12 inches from a bottom of the oxidizer vessel.

16. The process of claim 1 wherein the cumulative air required to produce said oxidized asphalt product stream softening temperature is at least 10% less than a process not including a diptube positioned below a liquid level in the oxidizer vessel.

17. The process of claim 1 wherein the cumulative air required to produce said oxidized asphalt product stream softening temperature is at least 50% less than a process not including a diptube positioned below a liquid level in the oxidizer vessel.

* * * * *